(12) United States Patent
Amir et al.

(10) Patent No.: US 9,078,214 B2
(45) Date of Patent: Jul. 7, 2015

(54) ADAPTIVE THRESHOLDING IN A WAKE-ON-RADIO SYSTEM

(75) Inventors: Haim Amir, Ramat-HaSharon (IL); Igal Zertser, Kfar-Saba (IL); Guy Terem, Ramat-HaSharon (IL)

(73) Assignee: Essence Security International Ltd., Herzlia Pituach (IL)

( * ) Notice: Subject to any disclaimer, the term of this patent is extended or adjusted under 35 U.S.C. 154(b) by 429 days.

(21) Appl. No.: 13/161,613

(22) Filed: Jun. 16, 2011

(65) Prior Publication Data

US 2011/0312285 A1 Dec. 22, 2011

Related U.S. Application Data

(60) Provisional application No. 61/355,196, filed on Jun. 16, 2010.

(51) Int. Cl.
*H04B 1/06* (2006.01)
*H04W 52/02* (2009.01)
*H04W 52/28* (2009.01)
*H04W 52/22* (2009.01)

(52) U.S. Cl.
CPC ...... *H04W 52/0245* (2013.01); *H04W 52/0225* (2013.01); *H04W 52/228* (2013.01); *H04W 52/287* (2013.01)

(58) Field of Classification Search
USPC .......... 455/69, 230, 423, 513, 522, 39, 452.2, 455/91, 115.1, 127.1, 343.2, 424; 341/155, 341/143, 156, 120, 118, 159, 121, 141
See application file for complete search history.

(56) References Cited

U.S. PATENT DOCUMENTS

| | | | |
|---|---|---|---|
| 5,956,638 A | 9/1999 | Chang et al. | |
| 6,201,993 B1 | 3/2001 | Kruse et al. | |
| 6,331,834 B1 | 12/2001 | Smith | |
| 6,624,750 B1 * | 9/2003 | Marman et al. | 340/506 |

(Continued)

FOREIGN PATENT DOCUMENTS

| | | |
|---|---|---|
| WO | WO 2009/120517 | 10/2009 |
| WO | WO 2010/032091 | 3/2010 |

OTHER PUBLICATIONS

European Search Report and the European Search Opinion Dated Jun. 13, 2012 From the European Patent Office Re. Application No. 11170185.0.

(Continued)

*Primary Examiner* — Ganiyu A Hanidu (57) ABSTRACT

A method for modifying a wake threshold for a wake-on-radio (WOR) receiver including: setting the wake threshold at a first level, counting false crossings of the wake threshold, and optionally modifying the wake threshold level based, at least in part, on a result of the counting. A receiver in a wake-on-radio (WOR) system including a wake-on-radio unit configured to implement the method for modifying a wake threshold. A method for setting a transmit power level of a transmitter for a wake-on-radio (WOR) system transmitter including: setting the level at a low level, receiving reports of false crossings of a wake threshold from a WOR receiver, and counting false crossings reported by the WOR receiver, and optionally modifying the transmit power level based, at least in part, on a result of the counting. A transmitter in a wake-on-radio (WOR) system including a transmit power adapter configured to implement the above method. Related apparatus and methods are also described.

19 Claims, 6 Drawing Sheets

(56) References Cited

U.S. PATENT DOCUMENTS

| | | | |
|---|---|---|---|
| 7,472,027 B1* | 12/2008 | Batcher et al. | 702/60 |
| 7,511,614 B2* | 3/2009 | Stilp et al. | 340/541 |
| 8,107,397 B1* | 1/2012 | Bagchi et al. | 370/254 |
| 2005/0121526 A1* | 6/2005 | Stewart et al. | 235/492 |
| 2006/0100001 A1 | 5/2006 | Pratt et al. | |
| 2006/0111062 A1* | 5/2006 | Cunningham et al. | 455/152.1 |
| 2006/0255131 A1* | 11/2006 | Stewart | 235/383 |
| 2006/0270382 A1* | 11/2006 | Lappetelainen et al. | 455/343.2 |
| 2007/0139159 A1* | 6/2007 | Mittal et al. | 340/10.1 |
| 2007/0140199 A1 | 6/2007 | Zhao et al. | |
| 2009/0059827 A1 | 3/2009 | Liu et al. | |
| 2009/0168678 A1 | 7/2009 | Han et al. | |
| 2009/0201843 A1 | 8/2009 | Wang | |
| 2009/0256674 A1 | 10/2009 | Lee et al. | |
| 2010/0023085 A1* | 1/2010 | Wu et al. | 607/30 |
| 2010/0054182 A1 | 3/2010 | Bachir et al. | |
| 2010/0081392 A1* | 4/2010 | Rousseau | 455/67.14 |
| 2010/0240319 A1* | 9/2010 | Matsuo | 455/68 |
| 2011/0158303 A1* | 6/2011 | Gauthier et al. | 375/224 |
| 2011/0202113 A1* | 8/2011 | Persson et al. | 607/60 |

OTHER PUBLICATIONS

Communication Pursuant to Rules 70(2) and 70a(2) EPC and Reference to Rule 39(1) EPC Dated Jul. 16, 2012 From the European Patent Office Re. Application No. 11170185.0.

Partial European Search Report Dated Feb. 16, 2012 From the European Patent Office Re. Application No. 11170185.0.

* cited by examiner

ADAPTIVE THRESHOLDING IN A WAKE-ON-RADIO SYSTEM

RELATED APPLICATION/S

This application claims the benefit of priority under 35 USC 119(e) of U.S. Provisional Patent Application No. 61/355,196 filed Jun. 16, 2010, the contents of which are incorporated herein by reference in their entirety.

FIELD AND BACKGROUND OF THE INVENTION

The present invention, in some embodiments thereof, relates to a method for adapting level in a Wake-On-Radio (WOR) system, for example a wake-up threshold level for a radio receiver, and/or a transmit power level of a transmitter in a WOR system.

A Wake-on Radio system typically allows a microcontroller to completely go to sleep, and possibly other sub-units of the system to go to sleep, while a radio receiving unit duty cycles on its own. WOR is typically used to conserve energy use in systems.

WOR systems operate in a variety of environments. Such environments potentially have widely different levels of electromagnetic noise. Some example WOR systems include one or more WOR units located in a house, such as a Home Area Network (HAN) or System, including two or more wireless devices operating at one or more RF channels in a half or full duplex mode. Some of the environments in which WOR units are located are electromagnetically noisy and some of them quieter.

When a WOR system operates in a noisy environment, a radio receiver may receive a false wake-up signal, by detecting a radio signal energy greater than a wake-up threshold, causing a false wake-up of a WOR unit. A false wake-up includes waking up to a signal not intended for the specific WOR unit, and/or waking up to noise instead of a true wake-up signal. Unnecessary wake-ups cause the system various problems, including, for example, depletion of a battery for WOR units, which are often designed to be WOR specifically to save energy and extend battery life.

Background art includes U.S. Pat. No. 5,956,638 to Chang et al., which teaches Radio Ports (RPs) in an unlicensed personal communications system adaptively, autonomously set their interference threshold and/or transmission power levels. This may be done by the RP measuring the signal level on each of the available channels and then setting the interference threshold and/or power level according to these measurements. In a preferred method, the interference threshold is determined by measuring the signal level on each channel, ranking the channels in order of measured signal level, and using these rankings to determine the threshold. The transmission power level may be set with reference to the adaptive interference threshold level. This level is determined by using the system and FCC power limitations and current conditions to provide a satisfactory transmission level.

Additional background art includes:
US Published Patent Application 2010/0054182 of Bachir et al;
U.S. Pat. No. 6,331,834 to Smith;
U.S. Pat. No. 6,201,993 to Kruse et al; and
U.S. Pat. No. 5,956,638 to Chang et al.

SUMMARY OF THE INVENTION

The present invention, in some embodiments thereof, teaches a method for adapting a threshold, for example for a Wake-On-Radio system.

Some embodiments of the invention include adjusting a wake threshold level for a WOR receiver based on counting false crossings of the wake threshold level. The adjusting is optionally an incremental adjustment.

Some embodiments of the invention include setting an initial wake threshold level for a WOR receiver at a first level, then counting false crossings of the wake threshold level and measuring time. If the count of the false crossings passes above a first trigger count within a first time period, then the level of the wake threshold is increased. If the count is below a second trigger count, the level of the wake threshold is optionally decreased.

It is noted that the count of false crossings may be performed by a full wakeup of a WOR system, or by a partial wakeup of such a system, having a WOR unit which wakes up, and an additional unit waking up only if the WOR unit indicates a true crossing.

In some embodiments of the invention, only false wake-ups are counted, with an intension to bring the count to substantially zero.

Some embodiments of the invention include setting a wake threshold level for a WOR receiver at a first level, counting false crossings of the wake threshold level, counting true crossings of the wake threshold level, measuring time, and computing a ratio-level of false crossings of the wake threshold level to true crossings of the wake threshold, named herein the false-to-true ratio.

In some embodiments of the invention a count of true crossings is a count of crossings in which the WOR receiver acts on a crossing of the wake threshold, and the WOR receiver indeed receives a valid and relevant packet, which is intended by a sender of the packet to cause a wake-up.

In some embodiments of the invention a count of true crossings is a count of crossings in which the wake-up signal is a wake-up signal intended for that WOR unit.

If the false-to-true ratio passes above a first ratio-level during a first time period, then the level of the wake threshold is increased. If the false-to-true ratio is below a second ratio-level, the level of the wake threshold is optionally decreased.

Adaptively changing the level of the wake threshold can serve to decrease false wake-ups. By adjusting the first trigger count and optionally the second trigger count a useful balance can be reached, between energy waste due to false awakenings and proper awakenings of the WOR unit. Raising the level of the wake threshold sets a WOR receiver to be optionally less sensitive to received signals, and may lower false wake-ups. Lowering the level of the wake threshold sets a WOR receiver to be optionally more sensitive to received signals, and may lower missed instances where the WOR receiver was to wake up and did not wake up.

It is noted that the method of adaptively changing the level of the wake threshold according to the present invention may optionally be used together with additional methods for estimating the noise, and optionally setting an initial wake threshold and/or adapting a wake threshold level.

Some embodiments of the invention include a method for adapting a transmit power for a transmitter in a Wake-On-Radio system. The method includes setting a transmit level for the transmitter at a first level, then having a target WOR receiver count false crossings of its wake threshold level and measure time. If the count of the false crossings passes above a first trigger count within a first time period, increase the level of the transmission. If the count is below a second trigger count, within a second time period, optionally decrease the level of the transmission.

Some embodiments of the invention include a method for adapting a transmit power for a transmitter in a Wake-On- Radio system. The method includes setting a transmit level for the transmitter at a first level, then having a target WOR receiver report a false-to-true ratio. If the false-to-true ratio passes above a first level during a first time period, increase the level of the transmission. If the false-to-true ratio is below a second level during a second time period, optionally decrease the level of the transmission.

According to an aspect of some embodiments of the present invention there is provided a method for modifying a wake threshold for a wake-on-radio (WOR) receiver including setting the wake threshold at a first level, counting false crossings of the wake threshold, and optionally modifying the wake threshold level based, at least in part, on a result of the counting.

According to some embodiments of the invention, further including optionally modifying the wake threshold as follows: if a count of the false crossings exceeds a first trigger within a first time period, then increasing the level of the wake threshold, else if a count of the false crossings falls below a second trigger within a second time period, then decreasing the level of the wake threshold.

According to some embodiments of the invention, further including counting true crossings of the wake threshold, computing a ratio of false crossing to true crossings during a time period, and optionally modifying the wake threshold as follows: if the ratio exceeds a first ratio-level, then increasing the level of the wake threshold, else if the ratio falls below a second ratio-level, then decreasing the level of the wake threshold.

According to some embodiments of the invention, further including producing a log of at least some wake-ups.

According to some embodiments of the invention, the log includes a plurality of values from a group which includes a wake threshold value, a count of false crossings, a count of true crossings, and a timestamp.

According to some embodiments of the invention, further including producing a notification if the level of the wake threshold rises above a specified high level.

According to some embodiments of the invention, further including transmitting the notification.

According to an aspect of some embodiments of the present invention there is provided a receiver in a wake-on-radio (WOR) system including a wake-on-radio unit configured to implement the above methods for modifying a wake threshold.

According to an aspect of some embodiments of the present invention there is provided a method for setting a transmit power level of a transmitter for a wake-on-radio (WOR) system transmitter including setting the level at a low level, receiving reports of false crossings of a wake threshold from a WOR receiver, and counting false crossings reported by the WOR receiver, and optionally modifying the transmit power level based, at least in part, on a result of the counting.

According to some embodiments of the invention, further including optionally modifying the transmit power level as follows: if the count of the false crossings exceeds a first trigger within a first time period, then increasing the level of the transmit power level, else if a count of the false crossings falls below a second trigger within a second time period, then decreasing the level of the transmit power level.

According to some embodiments of the invention, further including receiving reports of true crossings of a wake threshold from the WOR receiver, computing a ratio of false crossing to true crossings during a time period, and optionally modifying the transmit power level as follows: if the ratio exceeds a first ratio-level, then increasing the level of the transmit power level, else if the ratio falls below a second ratio-level, then decreasing the level of the transmit power level.

According to some embodiments of the invention, further including counting of wake-up messages sent by the transmitter, computing a ratio of false crossing to wake-up messages sent during a time period, and optionally modifying the transmit power level as follows: if the ratio exceeds a first ratio-level, then increasing the level of the transmit power level, else if the ratio falls below a second ratio-level, then decreasing the level of the transmit power level.

According to some embodiments of the invention, the receiving reports includes receiving reports from two or more WOR receivers, and the counting the false crossings includes counting the false crossings reported from all of the WOR receivers.

According to some embodiments of the invention, the receiving reports includes receiving reports from two or more WOR receivers, and the counting the false crossings includes counting the false crossings reported from fewer than all of the WOR receivers.

According to an aspect of some embodiments of the present invention there is provided a wake-on-radio (WOR) unit including a wake threshold adapter configured to implement the above methods.

According to an aspect of some embodiments of the present invention there is provided a transmitter in a wake-on-radio (WOR) system including a transmit power adapter configured to implement the above methods.

According to an aspect of some embodiments of the present invention there is provided a wake-on-radio (WOR) system including a transmitter configured to optionally modify a transmit power level based, at least in part, on a result of receiving reports of false crossings of a wake threshold from a WOR receiver, and a receiver configured to optionally send reports of false crossings of the wake threshold to the transmitter.

According to some embodiments of the invention, including a plurality of receivers configured to optionally send reports of false crossings of the wake threshold to the transmitter.

According to an aspect of some embodiments of the present invention there is provided a wake-on-radio (WOR) system including a transmitter configured to optionally modify a transmit power level based, at least in part, on a result of receiving reports of false crossings of a wake threshold from a WOR receiver, and a receiver configured to optionally modify the wake threshold level based, at least in part, on counting false crossings of a wake threshold, and to optionally send reports of false crossings of the wake threshold to the transmitter.

According to some embodiments of the invention, the transmitter and the receiver perform the optional modifications based upon counts of false crossings of a wake threshold made during mutually exclusive time periods.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a method for adapting level in a Wake-On-Radio (WOR) system, for example a wake-up threshold level for a Wake-On-Radio (WOR) unit, and/or a transmit power level of a transmitter in a WOR system.

When a Wake-On-Radio (WOR) system operates, a WOR receiver's wake-up threshold may be crossed with false energy detection. The crossings cause the system to wake-up unnecessarily. The above is especially true in an electromagnetically noisy environment.

When a WOR receiver detects energy in a reception channel, a WOR mechanism wakes the system's CPU. A received communication may be packets intended for the WOR receiver, or may be noise, such as, by way of some non-limiting examples: a packet addressed to another system's ID; and an unrecognized packet, such as a different manufacturer's system.

An optional method for preventing false wake-ups can be to set the wake-up threshold at a higher level. However, blindly setting the wake-up threshold at a higher level may decrease a reception range of a WOR receiver. Transmissions may not be received at the WOR receiver due to distance between the WOR receiver and a transmitter. In some embodiments of the invention a balance between false wake-ups and true wake-ups is found.

The present invention, in some embodiments thereof, finds a suitable wake-up threshold which reduces undesired wake-ups.

The present invention, in some embodiments thereof, may optionally be implemented in a system in which multiple radio channels are used for WOR. The present invention, in some embodiments thereof, may optionally be implemented to find a suitable wake-up threshold for each channel separately. Optionally, the same CPU performs the finding for each channel.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 1:
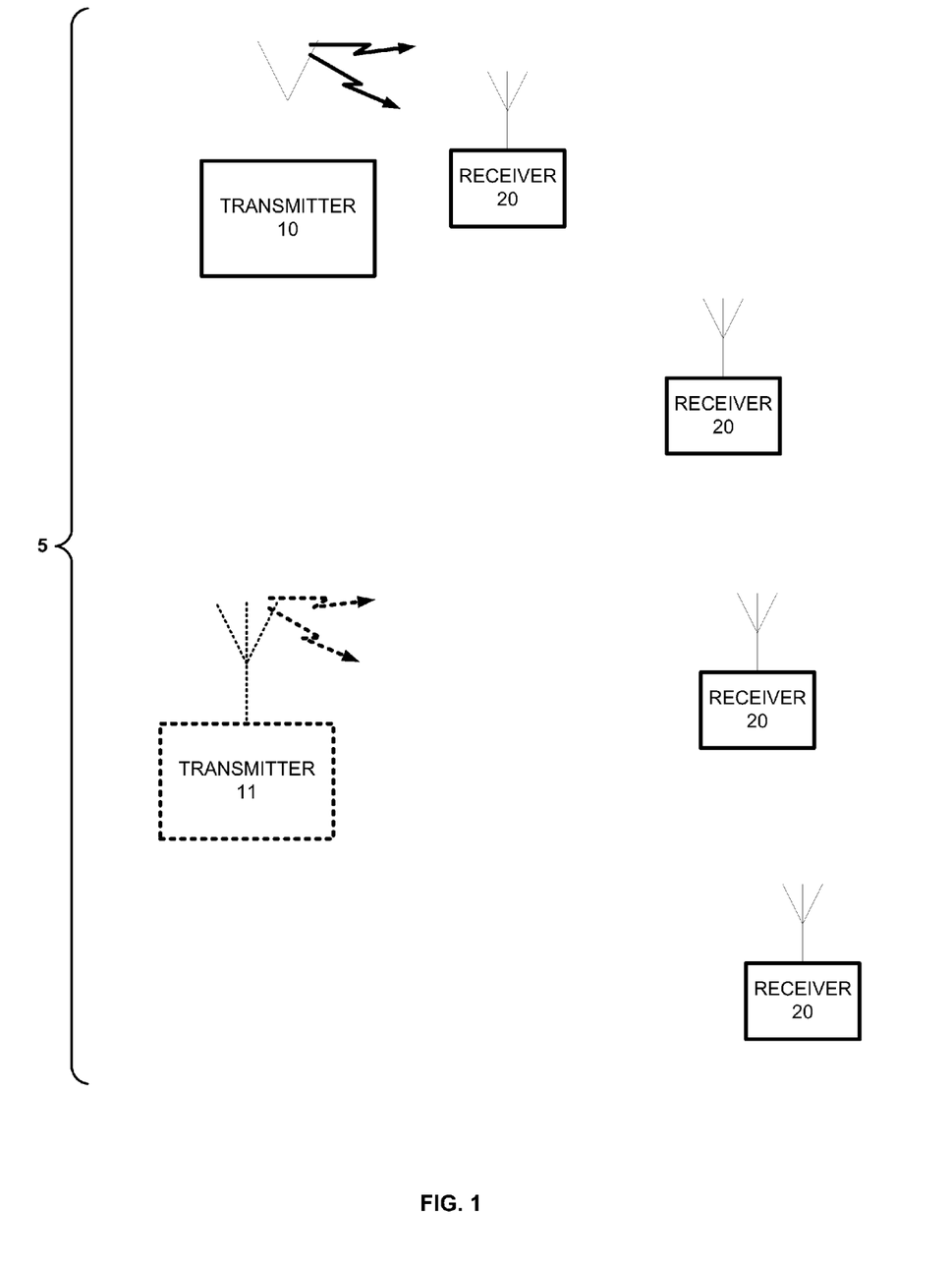
FIG. 1 is a simplified drawing of an example Wake-On-Radio system, optionally using an example embodiment of the invention.

Reference is now made to FIG. 1, which is a simplified drawing of an example Wake-On-Radio system, optionally using an example embodiment of the invention.

The example Wake-On-Radio (WOR) system includes a wireless network 5 which includes a first radio transmitter 10, and one or more radio receivers, all connected by direct and/or indirect radio communication with each other. It is noted that in some WOR systems, a WOR receiver may act as a relay station between another WOR receiver and the rest of the WOR network. In FIG. 1 four example Wake-On-Radio receivers 20 are located at various distances from the radio transmitter 10.

Optionally, one or more additional radio transmitters may participate in the wireless network 5. In FIG. 1 a second example radio transmitter 11 is placed, for example, at a different location than the first radio transmitter 10.

In the example network of FIG. 1, each one of the WOR receivers 20 is at a different distance from the transmitter 10. Various obstacles (not shown) may interfere with radio communication between the transmitter 10 and the WOR receivers 20. In all, some or all of the WOR receivers 20 may be receiving the radio transmissions from the transmitter 10 at different amplitudes. In such a scenario, if all the WOR receivers 20 are set to wake up to the same signal strength, some of the WOR receivers 20 may be suffering from false crossings of the wake-up threshold, while others may be suffering from not crossing the wake-up threshold when they should be waking up.

In some embodiments of the invention, the WOR receivers 20 benefit from adaptively setting their wake-up threshold to fit their radio signal environment.

It is noted that in some WOR systems, the transmitter is also a unit which may be a WOR unit, and/or be a unit which benefits greatly from controlling its power output, for example so as to save batteries.

In some embodiments of the invention, the transmitter 10 benefits from adaptively setting its transmission power to fit the radio signal environment of the WOR receivers to which it transmits.

Additionally, in the example network of FIG. 1, a second example radio transmitter 11 is also located within transmission distance of at least some of the wireless network 5.

In some embodiments of the invention, the second example radio transmitter 11 benefits from adaptively setting its transmission power to fit the radio signal environment of the WOR receivers to which it transmits.

In some embodiments of the invention searching for the practical wake-up threshold includes setting a lower limit (LL) for the threshold TH. In a non-limiting example LL is set to −110 dBm.

In some embodiments of the invention, LL is set to be a lowest possible value which the receiver can detect, optionally based on the receiver quality/ability/sensitivity.

In some embodiments of the invention, LL is set to be above a noise floor of the radio system. The noise floor of the radio system is determined by a variety of factors known in the art, including thermal noise. By way of a non-limiting example, an example embodiment of the present invention uses a radio system in which, based on the system bandwidth, at room temperature, the minimum theoretical noise floor is approximately −127 dBm, and LL is set to be approximately 10 db above that.

In some embodiments of the invention, LL is set to be a lowest value which is possible to be set on a receiver.

If during a given time span $T_{INC}$, a WOR receiver using an embodiment of the invention has too many false wake-ups, greater than a trigger value $N_{INC}$, the TH is raised by some increment, say $TH_{INC}$ dBm. The optional raising of the threshold TH enables dynamic adaptation of the TH over time, for cases in which noise increases over time.

In some embodiments of the invention, the increment $TH_{INC}$ is optionally dynamic, that is, changes over time. By way of a non-limiting example, $TH_{INC}$ optionally starts as a larger value, such as 10 dB, 5 dB, or 3 dB, and changes over time to a smaller value.

In some embodiments of the invention, the increment $TH_{INC}$ is optionally intentionally set high, to correct the wake threshold by intentionally overreaching, and subsequently correcting the increment $TH_{INC}$ to be lower.

In some embodiments of the invention a high limit (LH) is also optionally set for the threshold TH, by way of a non-limiting example, LH=−95 dBm.

In some embodiments of the invention, optionally when a WOR receiver is located near an interfering transmitter, LH is set to be higher than signals of the interfering transmitter as received at the location of the WOR receiver.

In some embodiments of the invention, if the threshold reaches the high limit LH, the WOR unit optionally sends a notification to an installer and/or a user and/or a service provider of the WOR receiver. In some embodiments of the invention the notification is sent by wireless, and/or by a wired network, if available. In some embodiments of the invention the notification optionally effects a display on the WOR unit, such as a warning light. The notification is sent and/or displayed in order to indicate that the device is operating in a problematic environment and/or parametric setup.

In some cases, the location of the WOR receiver, and/or the environment of the WOR receiver, is too noisy. In such cases, a different location should be considered for optimal WOR receiver performance.

In some embodiments of the invention, the notification includes a single bit, signifying yes or no, reached and/or passed the high threshold or not. In some embodiments, the notification includes more data, such as a log, as further explained below.

In some embodiments of the invention, the installer/user/service provider optionally operates the WOR receiver, in what may be termed a sampling mode, and verifies the operational environment by receiving the above-mentioned notifications and/or values which the WOR receiver may optionally be producing.

In some embodiments the WOR receiver produces a log of the true and/or false wake-ups and/or summary statistics of the true and/or false wake-ups such that the installer/user/service provider may study the operational environment even when the LH is not reached. By way of a non-limiting example, the log may be simple and optionally include a current TH, and may be more detailed, including a list of TH values and false/true counters with corresponding timestamps, even at one entry per event, enabling full analysis.

In some embodiments of the invention, the notifications are sent by radio link from a WOR unit to a central unit.

In some embodiments of the invention, the WOR receiver stores the notification and/or report until an operator accesses the notification and/or report.

In some embodiments of the invention, the operator causes the WOR unit to send the notification and/or report using a special transmission to the WOR unit. In some embodiments of the invention, the operator causes the WOR unit to display the notification and/or report by pressing buttons on the WOR unit, and optionally reading the report on a display on the WOR unit.

In some embodiments of the invention, the WOR receiver stores the notification and/or report onto a storage device, for later reading by a reading unit.

If during a given time span $T_{DEC}$, a WOR receiver using an embodiment of the invention has less false wake-ups than some trigger value $N_{DEC}$, the TH is lowered by some increment, $TH_{DEC}$ dBm. A non-limiting example of the time span $T_{DEC}$ includes having $T_{DEC}$ be somewhere in the range between $T_{DEC}=10*T_{INC}$ to $T_{DEC}=1000*T_{INC}$. For example: $T_{INC}=3.5$ Seconds and $T_{DEC}=70$ Seconds.

The optional lowering of the threshold TH enables dynamic adaptation of the TH over time, for cases in which noise decreases over time.

The optional incrementing of the threshold and the optional decrementing of the threshold together provide the WOR receiver with a dynamic wake-up threshold.

The dynamic wake-up threshold enables potentially lowering the number of false wake-ups in a WOR unit, potentially lowering power usage, potentially extending battery life.

A potential advantage to WOR receivers using some embodiments of the invention, over WOR receivers not using an embodiment of the invention includes saving energy for WOR receivers which are placed in an electromagnetically noisy environment and/or in the range of other radio systems/transmitters, since their threshold will be adjusted so as to minimize false awakenings. Many installations of WOR receivers occur in Home Area Networks (HANs) and/or other short distance networks and/or indoor wireless networks. The installations are well within an acceptable reception and transmission range for WOR receivers and transmitters.

Radio signal levels of both WOR receiver devices and of transmitter devices can be set to be lower than levels for a maximum range. A potential benefit of using embodiments of the invention in HANs and/or other short distance and/or indoor wireless networks is significant savings in energy consumption of the devices in the networks.

Another potential advantage to WOR receivers using some embodiments of the invention, over WOR receivers not using an embodiment of the invention includes prolonging battery life, and/or making use of smaller batteries for the devices in the networks.

Another potential advantage to WOR receivers using some embodiments of the invention, over WOR receivers not using an embodiment of the invention includes helping installers to find an acceptable and energy efficient location for installing the devices, that is, the transmitters and/or the WOR receivers.

In some embodiments of the invention, an installer looking for a location to locate a WOR receiver optionally gets a read of one or more of the following parameters: signal strength; noise floor; and TH of a system according to the present invention. Installing a WOR receiver according to one or more of the above parameters prevents installation in noisy locations, and/or finds a best location for installation under noisy conditions. The read may be by using a mobile unit for reading the parameters, and/or by reading a report or reports from a WOR station constructed according to the present invention.

Another potential advantage to WOR receivers using embodiments of the invention, over WOR receivers not using an embodiment of the invention includes optionally eliminating special purpose equipment for installers to find an acceptable and energy efficient location for installing the devices, that is, the transmitters and/or the WOR receivers. The installers may use the notifications and/or logs produced by the WOR receivers.

An example application of embodiments of the present invention is a Home Area Network (HAN) including at least two wireless devices operating at one or more RF channels in a half or full duplex mode. The application may save energy for devices which are relatively physically close to each other. For relatively far apart devices, the benefit may be lower since a desired signal level may be relatively near the possible TH. Most of the installations for devices in a HAN or other short distance or indoor wireless network are well within an acceptable reception and transmission range, and the energy levels are typically lower than energy levels for maximum range. The benefit of applying the embodiments of the present invention in HANs and other short distance or indoor wireless networks optionally has a significant effect on energy consumption of the devices.

Applying embodiments of the present invention optionally contribute to energy efficiency of the devices, optionally prolongs their battery life.

Applying embodiments of the present invention optionally helps installers in finding acceptable and energy efficient locations for installing the devices.

Applying embodiments of the present invention optionally eliminate an installer's need to use dedicated special devices in order to verify an appropriate or optimal location for installing the devices.

Figure 2A:
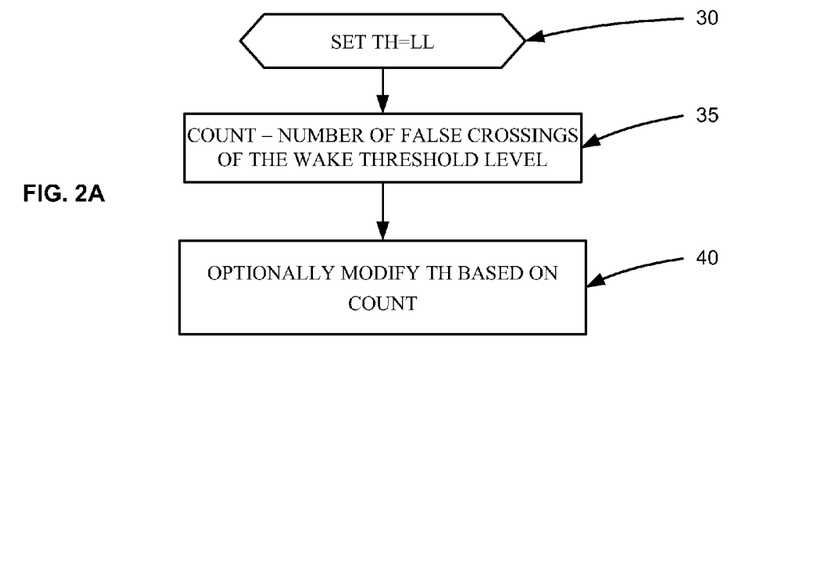
FIG. 2A is a simplified flowchart of a first example embodiment of the invention, modifying a threshold of a WOR receiver.

Reference is now made to FIG. 2A, which is a simplified flowchart of a first example embodiment of the invention, modifying a threshold of a WOR receiver.

FIG. 2A illustrates a principle of operation of the first example embodiment of the invention.

A wake-up threshold TH is optionally set at some initial low level (30).

From the time the initial threshold was set, a count is optionally made of the number of false crossings of the wake-up threshold TH (35).

False crossings optionally include receiving any signal not directed to the WOR receiver which is over the wake-up threshold, and also include a signal which, due to noise and/or mistakes in interpretation, mistakenly appears to be directed to the WOR receiver.

Based, at least in part, on the count of false crossings, optionally modifying the wake threshold level TH (40).

For example, if the count is greater than a specified count per a specific time period, there are too many false crossings, and TH is optionally raised.

For example, if the count is lower than a specified count per a specific time period TH is optionally lowered.

For example, true crossings may also be counted, a ratio may be computed between false crossings and true crossings, and if the ratio is higher than a specified ratio-level per a specific time period, TH is optionally lowered.

Figure 2B:
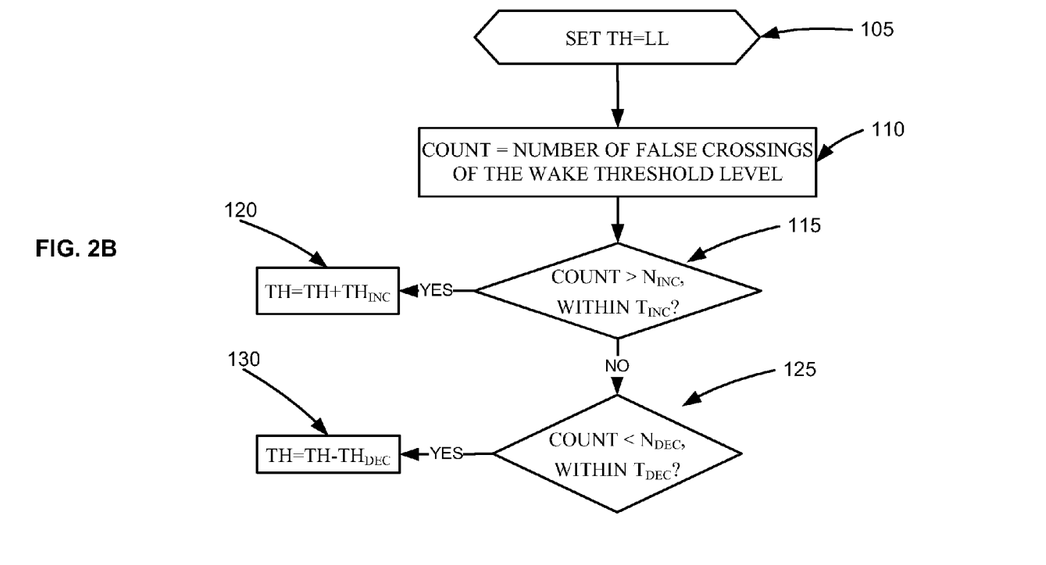
FIG. 2B is a simplified flowchart of a second example embodiment of the invention, modifying a threshold of a WOR receiver.

Reference is now made to FIG. 2B, which is a simplified flowchart of a second example embodiment of the invention.

FIG. 2B illustrates a principle of operation of the second example embodiment of the invention, modifying a threshold of a WOR receiver.

A wake-up threshold TH is optionally set at some initial low level (105).

From the time the initial threshold was set, a count is optionally made of the number of false crossings of the wake-up threshold TH (110).

False crossings include receiving any signal not directed to the WOR receiver which is over the wake-up threshold, and also include a signal which, due to noise and/or mistakes in interpretation, mistakenly appears to be directed to the WOR receiver.

If the count of false crossings is greater than a specified $N_{INC}$, within a time period $T_{INC}$ (115), then the wake-up threshold TH is optionally increased by a specific amount $TH_{INC}$ (120).

If not, and if the count of false crossings is less than a specified $N_{DEC}$, within a time period $T_{DEC}$ (125), then the wake-up threshold TH is optionally decreased by a specific amount $TH_{DEC}$ (130).

It is noted that optionally decreasing TH adaptively provides additional range while not necessarily increasing the rate and/or count of false crossings.

Figure 2C:
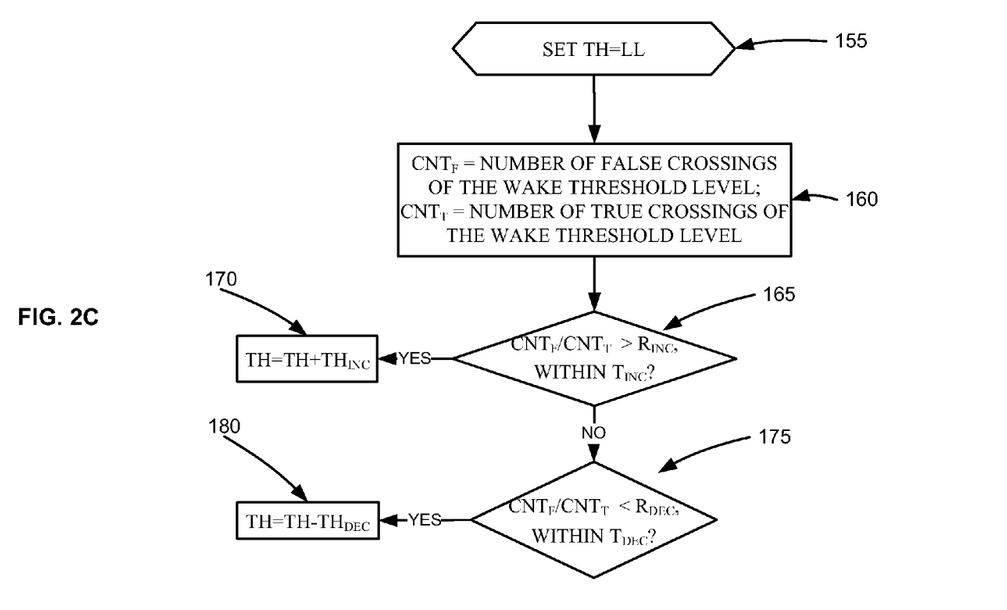
FIG. 2C is a simplified flowchart of a third example embodiment of the invention, modifying a threshold of a WOR receiver.

Reference is now made to FIG. 2C, which is a simplified flowchart of a third example embodiment of the invention.

FIG. 2C illustrates a principle of operation of the second example embodiment of the invention, modifying a threshold of a WOR receiver.

A wake-up threshold TH is optionally set at some initial low level (155).

From the time the initial threshold was set, a count is optionally made of the number of false crossings ($CNT_F$) of the wake-up threshold TH, and a count may also optionally be made of the number of true crossings ($CNT_T$) of the wake-up threshold TH (160).

If the ratio ($CNT_F/CNT_T$) of the count of false crossings to the count of true crossings is greater than a specified $R_{INC}$, within a time period $T_{INC}$ (165), then the wake-up threshold TH is optionally increased by a specific amount $TH_{INC}$ (170).

If not, and if the ratio $CNT_F/CNT_T$ is less than a specified $R_{DEC}$, within a time period $T_{DEC}$ (125), then the wake-up threshold TH is optionally decreased by a specific amount $TH_{DEC}$ (130).

Figure 3:
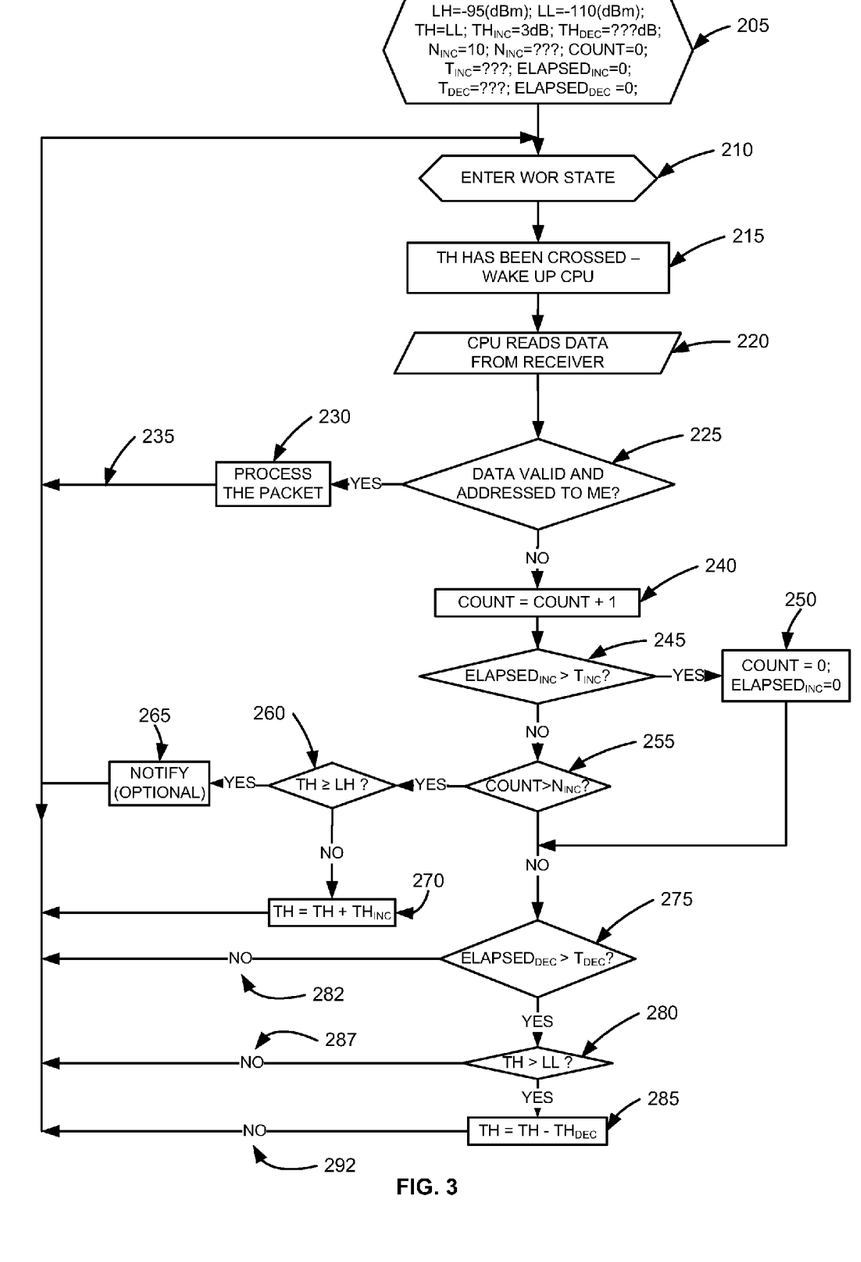
FIG. 3 is a simplified flowchart of a fourth example embodiment of the invention, modifying a threshold of a WOR receiver.

Reference is now made to FIG. 3, which is a simplified flowchart of a fourth example embodiment of the invention, modifying a threshold of a WOR receiver.

FIG. 3 illustrates, in more detail, a principle of operation of the fourth example embodiment of the invention.

Operation starts by optionally setting some initial values (205). The initial values depicted in FIG. 3 are values relevant to the second example embodiment, but are not meant to limit possible values in other embodiments of the invention.

Example initial values relevant to the example embodiment of FIG. 3 include:

1) The low limit, LL=−110 dBm;
2) The high limit, LH=−95 dBm;
3) The amount for incrementing the threshold, $TH_{INC}$=3 dB;
4) The amount for decrementing the threshold, $TH_{DEC}$=3 dB;
5) A number of false crossings, beyond which the WOR receiver increments the threshold, $N_{INC}$=10;
6) A number of false wake-ups, below which the WOR receiver decrements the threshold, $N_{DEC}$=1;
7) The counter for false wake-ups COUNT=0;
8) An initial value for a time period in which, if there are more than $N_{INC}$ false wake-ups, the threshold is incremented, $T_{INC}$=3.5 seconds;
9) A first elapsed time counter, measuring elapsed time for comparison to $T_{INC}$, $ELAPSED_{INC}$=0;
10) An initial value for a time period in which, if there are more than $N_{DEC}$ false wake-ups, the threshold is decremented, $T_{DEC}$=70 seconds; and
11) A first elapsed time counter, measuring elapsed time for comparison to $T_{DEC}$, $ELAPSED_{DEC}$=0.

In some embodiments of the invention, some or all of the initial values may optionally be hard-coded; in which case operation does not necessarily start by setting some of the initial values; or an installer may set some or all of the initial values.

Having set the initial values, a Wake On Radio (WOR) device optionally enters, at some time, a WOR state (210), and the WOR device sleeps, waiting to receive a wake-up signal.

When the WOR device receives a radio signal at a power which crosses the wake-up threshold TH, a radio receiver included in the WOR device wakes up a CPU included in the WOR device (215).

The CPU reads data which has been received by the receiver (220), and analyzes the data. The CPU checks if the data is valid, and data contains a message addressed to the WOR device (225). If so, the WOR device processes the data (230), and optionally goes back to a WOR sleep state (235).

If the data is not valid, and/or the data contains a message not addressed to the WOR device, The WOR device increments the false wake-up counter COUNT (240).

The WOR device then checks whether elapsed time $ELAPSED_{INC}$ since a last zeroing of $ELAPSED_{INC}$ has passed beyond $T_{INC}$ (245).

If $ELAPSED_{INC}$ is greater than $T_{INC}$, the WOR device zeroes the counter COUNT and zeroes the elapsed time measurement $ELAPSED_{INC}$ (250).

If $ELAPSED_{INC}$ is not greater than $T_{INC}$, the WOR device checks whether the false wake-up counter COUNT has a value greater than the trigger value $N_{INC}$ (255).

If yes, then action is optionally taken, based on having counted too many false wake-ups in a specified period of time $T_{INC}$. The action is optionally raising the wake-up threshold TH. Optionally, as depicted in FIG. 3, a check is made if the wake-up threshold TH is greater than or equal to the high limit LH (260).

If the wake-up threshold TH is greater than or equal to the high limit LH, the WOR device optionally produces a notification is produced, and optionally sends the notification (265).

In some embodiments of the invention the notification is saved, as an entry in a log file kept in the WOR device. Optionally, a user and/or a technician accesses the log, via a user interface built into the WOR device, and/or via radio communication with the WOR device. Optionally, the notification is transmitted.

In some embodiments of the invention the notification is sent to a transmitter which sent at least one of the messages which caused the WOR device to wake-up.

The WOR device setting the wake-up threshold at or even substantially close to the high limit is indication of many false wake-ups. In many instances this indicates a problem, and finding the problem, whether by radio transmission of the notification, and/or by accessing the notification and/or a log in the WOR device, may cause a user and/or a technician to try to lower noise in the environment and/or in the transmitter to WOR device communications. Lowering noise may be achieved by re-orienting antennas, and/or by relocating the WOR device.

If the wake-up threshold TH is lower than LH, then the WOR device increments the wake-up threshold TH by $TH_{INC}$ (270).

After incrementing, or not incrementing, the wake-up threshold TH, the WOR device optionally goes back to a WOR sleep state (275).

If the false wake-up counter COUNT does NOT have a value greater than the trigger value $N_{INC}$, and also if the elapsed time $ELAPSED_{INC}$ has NOT passed beyond $T_{INC}$, the WOR device checks whether elapsed time $ELAPSED_{DEC}$ since a last zeroing of $ELAPSED_{DEC}$ has passed beyond $T_{DEC}$ (280).

If $ELAPSED_{DEC}$ is NOT greater than $T_{DEC}$, the WOR device optionally goes back to a WOR sleep state (282).

If $ELAPSED_{DEC}$ is greater than $T_{DEC}$, the WOR optionally checks whether the wake-up threshold TH is greater than the low limit LL (280).

If the wake-up threshold TH is NOT greater than the low limit LL, the WOR device optionally goes back to a WOR sleep state (287).

If the wake-up threshold TH is greater than the low limit LL, the WOR device optionally decrements the wake-up threshold TH by $TH_{DEC}$ (285), and optionally goes back to a WOR sleep state (292).

Some variations optionally included in some embodiments of the invention, will now be described.

In some embodiments of the invention, LL includes any value within the range −127 to −110 dBm.

A lower theoretical value for LL is a system-thermal-noise given by the following equation:

$$P_{dBm} = -174 + 10\log_{10}(\Delta f) + \text{a minimum SNR required by a modem optionally included in the WOR system.}$$

In a non-limiting example embodiment of the invention $\Delta f$=64 KHz and SNRmin=10 dB, so LL is approximately −116 dBm.

An upper limit for LL is optionally not derived from theoretical considerations, but by a transceiver chip capabilities. In an example embodiment of the invention, the upper limit fro LL is optionally 10-30 dB above the lower limit.

In some embodiments of the invention, LH includes any value within the range −116 to −70 dBm. Optionally, LH is in a range between a few dB above LL, to a value which is still lower than an expected received signal for a true crossing.

In some embodiments of the invention, $TH_{INC}$ includes a value within the range 1 to 10 dBm. In some embodiments of the invention, the value of $TH_{INC}$ is based on the hardware capability of the WOR receiver, which may be a commercially available WOR receiver, such as part number CC1101 provided by Texas Instruments.

In some embodiments of the invention, $TH_{DEC}$ includes a value within the range 1 to 10 dBm. $TH_{DEC}$ is not necessarily equal to $TH_{INC}$, although in some embodiments $TH_{DEC}=TH_{INC}$.

In some embodiments of the invention, $N_{INC}$ includes a value within the range 1 to 10. The value of $N_{INC}$ is not limited by theory. In some embodiments of the invention, low values like 1-10 are used. An example reasoning behind choosing a value for $N_{INC}$ is so that TH may be increased for false crossings, and on the other hand so that some stability and noise immunity are provided to the adaptive mechanism. In some embodiments a value like 4 or 5 may be used.

In some embodiments of the invention, $N_{DEC}$ includes any value within the range 1 to 10. $N_{INC}$ is not necessarily equal to $N_{DEC}$, although in some embodiments $N_{INC}=N_{DEC}$. Reasoning behind choosing the value of $N_{DEC}$ is similar to the reasoning behind choosing the value of $N_{INC}$ described above.

In some embodiments of the invention, $T_{INC}$ includes any value within the range 1 to 5 seconds.

In some embodiments of the invention, $T_{DEC}$ includes any value within the range 60 to 500 seconds. In some embodiments of the invention, $T_{DEC}$ is larger than $T_{INC}$.

The present invention, in some embodiments thereof, finds a suitable initial wake-up threshold according to measured parameters of the WOR system. Such parameters include, by way of a non-limiting example, noise in an electromagnetic environment of the WOR system; a time-of-day; a specific location of the WOR receiver and/or of the WOR transmitter; electromagnetic noise known to be present in a radio transmission channel; and so on.

The present invention, in some embodiments thereof, may optionally identify patterns of noise levels and optionally find a suitable initial wake-up threshold and/or adapt the wake-up threshold according to the identified patterns.

Figure 4:
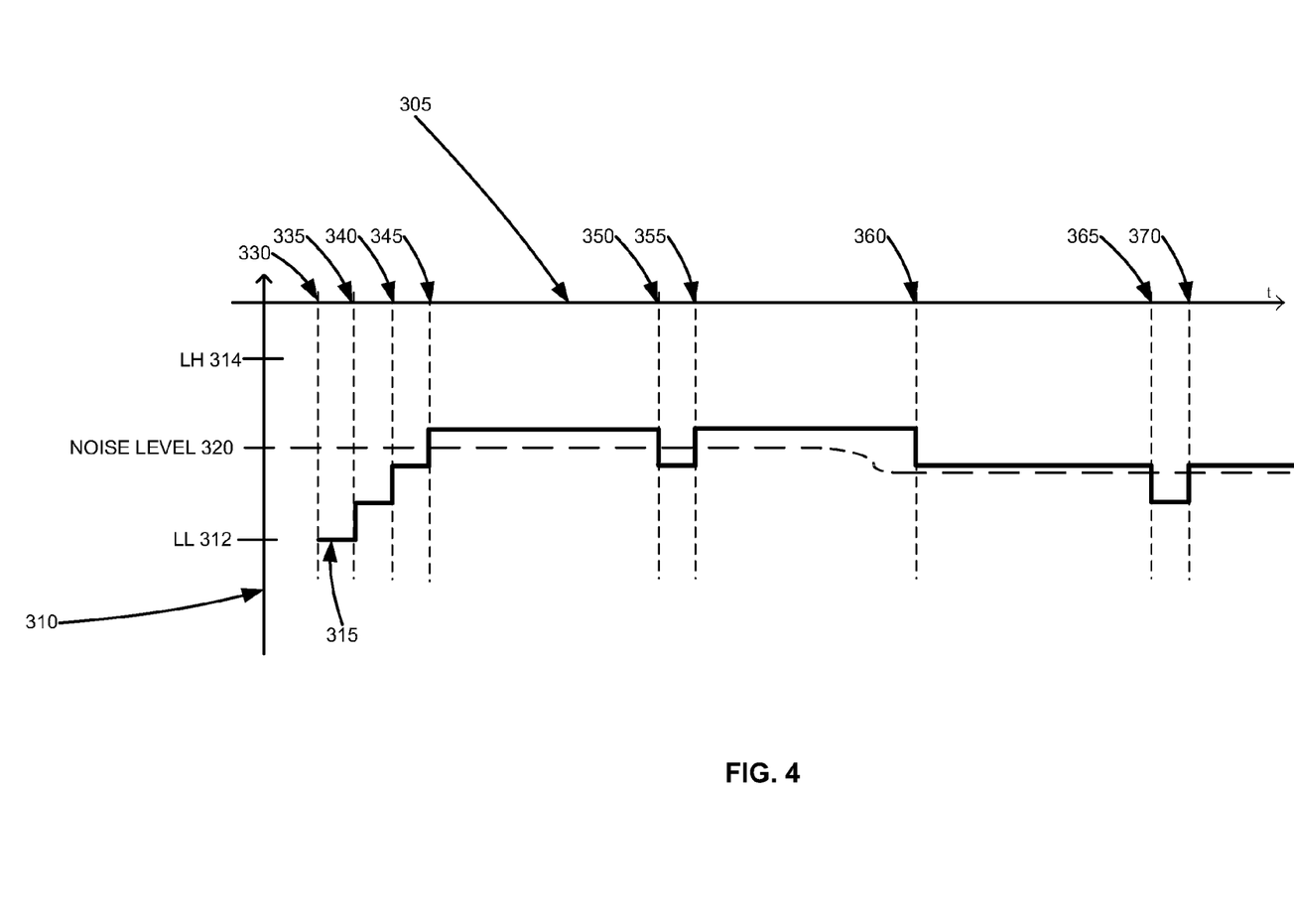
FIG. 4 is a simplified graphical illustration of an example of how a receiver's wake-up threshold may change over time, when an embodiment of the invention is used.

Reference is now made to FIG. 4, which is a simplified graphical illustration of an example of how a receiver's wake-up threshold may change over time, when an embodiment of the invention is used.

FIG. 4 depicts, on a horizontal axis, a qualitative timeline 305. Time units are not marked on the timeline 305, which serves for qualitative illustrative purposes.

Also depicted, on a vertical axis, is power 310. Power units are not marked on the axis marking power 310, which serves for qualitative illustrative purposes, though the power 310 of FIG. 4 uses a scale of dBm.

Also depicted are a graph of the receiver's wake-up threshold level 315 and a graph of noise level 320 over the time of the example of FIG. 4.

FIG. 4 is a simplified graphical illustration of how the receiver's wake-up threshold level 315 changes over time, and in response to a change in noise level, when using an embodiment of the present invention At an initial time 330 the receiver's wake-up threshold level optionally starts at LL (312).

At this wake-up threshold level LL (312), according to the example of FIG. 4, there are too many false wake-ups, and at a time 335, optionally after $T_{INC}$, the WOR receiver raises the wake-up threshold level, optionally by $TH_{INC}$.

At the new wake-up threshold level, optionally $LL+TH_{INC}$, according to the example of FIG. 4, there are still too many false wake-ups, and at a time 340, optionally again after $T_{INC}$, the WOR receiver raises the wake-up threshold level, again optionally by $TH_{INC}$.

At the new wake-up threshold level, optionally $LL+2*TH_{INC}$, according to the example of FIG. 4, there are still too many false wake-ups, and at a time 345, optionally again after $T_{INC}$, the WOR receiver raises the wake-up threshold level, again optionally by $TH_{INC}$.

At this wake-up threshold level, optionally $LL+3*TH_{INC}$, the WOR receiver is "comfortable", without too many false wake-ups. Because there are not too many false wake-ups, optionally during a period of $T_{DEC}$ (not necessarily equal to $T_{INC}$, and optionally $\gg T_{INC}$), the WOR receiver attempts, at a time 350, to lower the wake-up threshold level, optionally by $TH_{DEC}$, (not necessarily equal to $TH_{INC}$).

At the new wake-up threshold level, optionally $LL+3*TH_{INC}-TH_{DEC}$, according to the example of FIG. 4, there are too many false wake-ups, and at a time 355, optionally again after $T_{INC}$, the WOR receiver raises the wake-up threshold level, again optionally by $TH_{INC}$.

At this wake-up threshold level, optionally $LL+4*TH_{INC}-TH_{DEC}$, the WOR receiver is again "comfortable", without too many false wake-ups. During this period of time, somewhat after time point 355, the example of FIG. 4 depicts the noise level 320 decreasing. Because there are not too many false wake-ups, optionally during a period of $T_{DEC}$, the WOR receiver attempts, at a time 360, to lower the wake-up threshold level, optionally by $TH_{DEC}$, (not necessarily equal to $TH_{INC}$).

At this wake-up threshold level, optionally $LL+4*TH_{INC}-2*TH_{DEC}$, the WOR receiver is still "comfortable", without too many false wake-ups, and the WOR receiver again attempts, at a time 365, to lower the wake-up threshold level, optionally by $TH_{DEC}$.

At the new wake-up threshold level, optionally $LL+4*TH_{INC}-3*TH_{DEC}$, according to the example of FIG. 4, there are still too many false wake-ups, and at a time 370, optionally again after $T_{INC}$, the WOR receiver raises the wake-up threshold level, again optionally by $TH_{INC}$.

This ends the example of FIG. 4, which illustrates a raising and a lowering of the wake-up threshold level, both in reaction to the number of false wake-ups and in reaction to changes in a noise level.

In some embodiments of the invention the wake-up threshold is optionally set to change based on time-of-day. In some environments the level of noise changes in a fashion related to the time-of-day. By way of a non-limiting example, there are more radio signals at home during a time when humans are up and about, and the radio environment is noisier at such a time. At such a time the wake-up threshold is optionally raised based on time-of-day, without waiting for false threshold crossings to cause the change.

In some embodiments of the invention the wake-up threshold is optionally set to change based on an environmental sensor reading. Some WOR systems include a network of environmental sensors with WOR units. The WOR units are, in some cases, caused to be operational by the environmental sensors measuring some activity, such as detecting an intruder into a guarded location, which may trigger several detectors during a short time period; an earth temblor; rain; and so on. In such cases it is expected that when one sensor measures the activity, most or all sensors will measure the activity, and the network may optionally become noisy. In such cases the wake-up threshold is optionally low when not measuring the activity, yet raised by a step when measuring the activity.

It is noted that adjusting a power level of a transmitter may also affect the number of false wake-ups in a WOR receiver, by affecting the signal to noise ratio at the WOR receiver. One example method by which a transmitter can be made aware of the number of false wake-ups in a WOR receiver, is by the WOR receiver reporting false wake-ups to the transmitter and/or to a centralized unit in the WOR system set up to collect such reports. In some embodiments of the invention the WOR receiver optionally reports each false wake-up as it happens. In some embodiments of the invention the WOR receiver counts false wake-ups and sends the count every specified period of time. In some embodiments of the invention the WOR receiver counts false wake-ups and sends the count upon receiving a radioed request. In some embodiments of the invention the WOR receiver counts false wake-ups and sends the count every specified number of false wake-ups.

Figure 5:
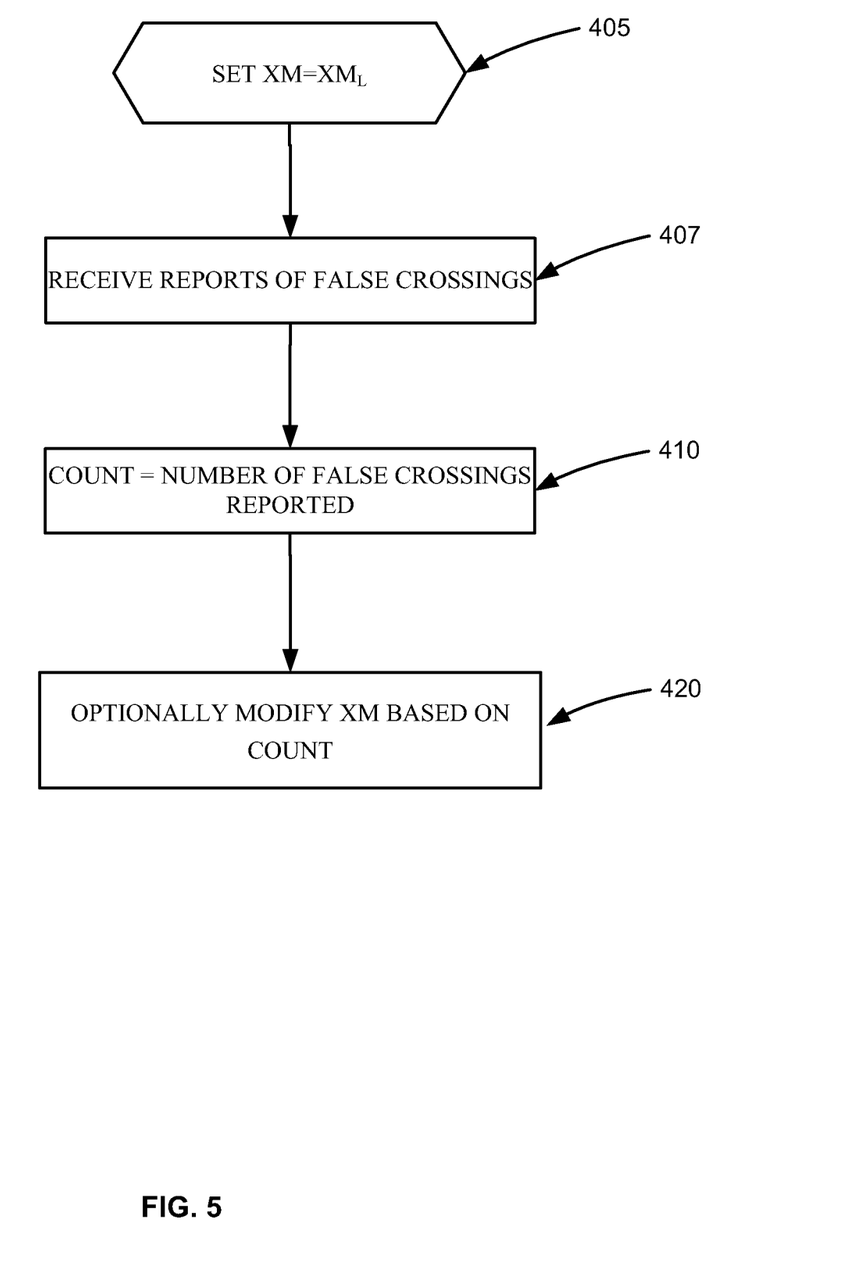
FIG. 5 is a simplified flowchart of a fifth example embodiment of the invention, modifying a transmit power level of a transmitter in a system including one or more WOR receivers.

Reference is now made to FIG. 5, which is a simplified flowchart of a fifth example embodiment of the invention, modifying a transmit power level of a transmitter in a system including one or more WOR receivers.

FIG. 5 illustrates a principle of operation of the fifth example embodiment of the invention.

A transmit power level XM of the transmitter is set at some initial low level $XM_L$ (405).

The transmitter optionally receives reports of false crossings of the wake-up threshold of a WOR receiver (407).

From the time the initial transmit power level XM was set, a count is made of false crossings of the wake-up threshold reported (410).

Based, at least in part, on one or more reports received of a count of false crossings, optionally modifying the transmit power level XM (420).

For example, if the counts reported are greater than a specified count per a specific time period, there are too many false crossings, and XM is optionally raised.

For example, if the counts reported are lower than a specified count per a specific time period XM is optionally lowered.

For example, true crossings may also be reported and counted, a ratio may be computed between false crossings and true crossings, and if the ratio is higher than a specified ratio-level per a specific time period, XM is optionally raised.

It is noted that the description of the modifying the transmit power level of the transmitter with reference to FIG. 5 corresponds to the modifying of the threshold of the WOR receiver with reference to FIG. 2A.

In some embodiments of the invention the modifying the transmit power level of the transmitter is performed in a manner corresponding to the modifying of the threshold of the WOR receiver with reference to FIGS. 2B, 2C, and 3.

In some embodiments of the invention, the modifying the transmit power level of the transmitter is performed based on reports received of a count of false crossings, yet a count of true crossings is optionally not made based on reports from a WOR receiver, rather it is the transmitter which counts how many messages it has transmitted which the WOR receiver should have counted as true crossings.

It is noted that in a WOR system, a receiver's wake-up threshold level and a transmitter's transmit power level may each be set by taking into account a count of false wake-ups and/or false crossings of the wake-up threshold at one or more WOR receivers.

In some embodiments of the invention, when the receivers' wake-up threshold levels are being adjusted, the transmitter's transmit power level is held fixed, and when the transmitter's transmit power level is being adjusted with some hysteresis or not, the receivers' wake-up threshold levels are held fixed.

In some embodiments of the invention, time periods for changing the receivers' wake-up thresholds are mutually exclusive from the time periods for changing the transmitter's transmit power level.

In some embodiments, the time periods for changing the receivers' wake-up thresholds are significantly shorter, for example, by a hundred-fold, than the time periods for changing the transmitter's transmit power level. In such embodiments, the receivers "track" the transmitter. The receivers optionally set optimal threshold levels based on the transmitter's power level. The transmitter, which may be a transmitting unit of a transceiver, optionally receives counts of false crossings of the wake threshold level sent by the receivers, and optionally adjusts the transmit power level in an attempt to improve the counts of false crossings, after which the receivers again optionally set threshold levels based on the new transmit power level, and so on.

In some embodiments of the invention, the receivers' wake-up threshold levels are optionally adjusted, while the transmitter's power level is held fixed. After the receivers cease adjusting wake-up threshold levels, the transmitter optionally adjusts the transmit power level, while the receivers' wake-up threshold levels are held fixed. Optionally, the transmitter may lower the transmit power level, seeking a lower-power mode while maintaining an acceptable level of counts of false crossings of the wake threshold level reported by the receivers. Optionally, the transmitter may raise the transmit power level, seeking lower counts of false crossings of the wake threshold level reported by the receivers.

In some embodiments of the invention a receiver is also a transmitter, and a transmitter is also a receiver. The receiver/transmitter optionally uses the method of the present invention to set a transmit level and/or a wake-up level for each of the separate uses: receiver and transmitter.

In some embodiments of the invention there are two or more WOR receivers receiving communications from the transmitter of the WOR system.

In some embodiments of the invention the counting of reported false crossings aggregates the reports from all WOR receivers. The count reception (407) and the count (410) of the flowchart of FIG. 5 refer to all of the WOR receivers which make the reports.

In some embodiments of the invention the counting of reported false crossings aggregates the reports from less than all of the WOR receivers. The count reception (407) and the count (410) of the flowchart of FIG. 5 refer to less than all of the WOR receivers which make the reports.

In some embodiments the transmitter disregards reports of false crossings made by some WOR receivers. In some embodiments the transmitter disregards reports of false crossings made by some WOR receivers which are specified during setup of the WOR system, by a person setting up the system. The disregarding may be set up due to more than one reason, such as, by way of a non-limiting example, when one or more WOR receivers are set up in a particularly not-noisy environment, and the person setting up the WOR system wants the transmit power level to be influenced particularly by one or more WOR receivers set up in a more-noisy environment.

It is expected that during the life of a patent maturing from this application many relevant Wake-On-Radio mechanisms will be developed and the scope of the term Wake-On-Radio is intended to include all such new technologies a priori.

The terms "comprising", "including", "having" and their conjugates mean "including but not limited to".

As used herein, the singular form "a", "an" and "the" include plural references unless the context clearly dictates otherwise. For example, the term "a unit" or "at least one unit" may include a plurality of units, including combinations thereof.

The terms "example" and "exemplary" are used herein to mean "serving as an example, instance or illustration". Any embodiment described as "an example" or "exemplary" are not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for setting a transmit power level of a transmitter for a wake-on-radio (WOR) system comprising a transmitter for sending wake-up messages and a WOR receiver for receiving such wake-up messages, the method comprising:
    setting the transmit power level of a transmitter for sending wake-up messages at a low level;
    setting a wake threshold of a WOR receiver;
    the receiver sending a report of false crossings of said wake threshold;
    the transmitter for sending wake-up messages receiving said report of false crossings of said wake threshold from said WOR receiver;
    the transmitter for sending wake-up messages computing a value based on the false crossings reported by the WOR receiver;
    the transmitter for sending wake-up messages modifying the transmit power level of the transmitter for sending wake-up messages based, at least in part, on the value; and
    the transmitter for sending wake-up messages using said modified transmit power to send a wake-up message to said WOR receiver.

2. The method of claim 1 and further comprising modifying a wake threshold level for the WOR receiver by:
    setting the wake threshold level for the WOR receiver at a first level;
    the WOR receiver counting false crossings of the wake threshold level; and
    the WOR receiver modifying the wake threshold level for the WOR receiver based, at least in part, on a result of the counting.

3. The method of claim 2 and further comprising modifying the wake threshold level as follows:
    if a count of the false crossings exceeds a first trigger within a first time period, then increasing the level of the wake threshold for the WOR receiver;
    else if a count of the false crossings falls below a second trigger within a second time period, then decreasing the level of the wake threshold for the WOR receiver.

4. The method of claim 2 and further comprising counting true crossings of the wake threshold, computing a ratio of false crossing to true crossings during a time period, and modifying the wake threshold for the WOR receiver as follows:
    if the ratio exceeds a first ratio-level, then increasing the level of the wake threshold for the WOR receiver;
    else if the ratio falls below a second ratio-level, then decreasing the level of the wake threshold for the WOR receiver.

5. The method of claim 4 and further including producing a log of at least some wake-ups.

6. The method of claim 5 in which the log comprises a plurality of values from a group which includes:
    a wake threshold value;
    a count of false crossings;
    a count of true crossings; and
    a timestamp.

7. The method of claim 2 and further including the WOR receiver producing a notification if the level of the wake threshold for the WOR receiver rises above a specified high level.

8. The method of claim 7 and further including transmitting the notification to the transmitter.

9. The method of claim 1 and further comprising modifying the transmit power level of the transmitter for sending wake-up messages as follows:

if the value exceeds a first trigger within a first time period, then increasing the level of the transmit power level of the transmitter for sending wake-up messages;
else if the value falls below a second trigger within a second time period, then decreasing the level of the transmit power level of the transmitter for sending wake-up messages.

10. The method of claim 1 and further comprising:
the transmitter for sending wake-up messages receiving reports of false crossings of a wake threshold from the WOR receiver;
computing a ratio of false crossing to true crossings during a time period; and
the transmitter for sending wake-up messages modifying the transmit power level of the transmitter for sending wake-up messages as follows:
if the ratio exceeds a first ratio-level, then increasing the level of the transmit power level of the transmitter for sending wake-up messages;
else if the ratio falls below a second ratio-level, then decreasing the level of the transmit power level of the transmitter for sending wake-up messages.

11. The method of claim 1 and further comprising:
counting of wake-up messages sent by the transmitter for sending wake-up messages during a time period;
computing a ratio of false crossing to wake-up messages sent during a time period; and
the transmitter for sending wake-up messages modifying the transmit power level of the transmitter for sending wake-up messages as follows:
if the ratio exceeds a first ratio-level, then increasing the level of the transmit power level of the transmitter for sending wake-up messages;
else if the ratio falls below a second ratio-level, then decreasing the level of the transmit power level of the transmitter for sending wake-up messages.

12. The method of claim 1 in which:
the receiving reports comprises receiving reports of false crossings from two or more WOR receivers; and
the computing the value comprises the transmitter for sending wake-up messages aggregating the false crossings reported.

13. The method of claim 1 in which:
the receiving reports comprises the transmitter for sending wake-up messages receiving reports of false crossings from two or more WOR receivers; and
the counting the false crossings comprises the transmitter for sending wake-up messages counting the false crossings reported from fewer than all of the WOR receivers.

14. A wake-on-radio (WOR) system comprising:
a WOR receiver configured to send reports of false crossings of a wake threshold to a transmitter for sending wake-up messages; and
said transmitter for sending wake-up messages configured:
to set the transmit power level of said transmitter for sending wake-up messages at a low level;
to receive a report of false crossings of said wake threshold from said WOR receiver;
to compute a value based on said report of false crossings of said wake threshold from said WOR receiver; and
to modify a transmit power level based, at least in part, on a result of said value; and
to send a wake-up message at said modified transmit power level to said WOR receiver.

15. The system of claim 14 comprising a plurality of receivers configured to optionally send reports of false crossings of the wake threshold to the transmitter.

16. The system of claim 14 wherein:
said receiver is configured to optionally modify said wake threshold level based, at least in part, on counting false crossings of a wake threshold.

17. The system of claim 16 in which the transmitter and the receiver perform the optional modifications based upon counts of false crossings of a wake threshold made during mutually exclusive time periods.

18. The method of claim 1 in which the WOR system comprises a WOR network comprising at least one transmitter and at least one WOR receiver.

19. The method of claim 18 in which the WOR network comprises at least one network selected from a group consisting of:
a Home Area Network;
a short distance network; and
an indoor wireless network.

* * * * *